Nov. 27, 1934.　　　R. J. OLANDER　　　1,982,016
HAND BRAKE
Filed Feb. 21, 1931
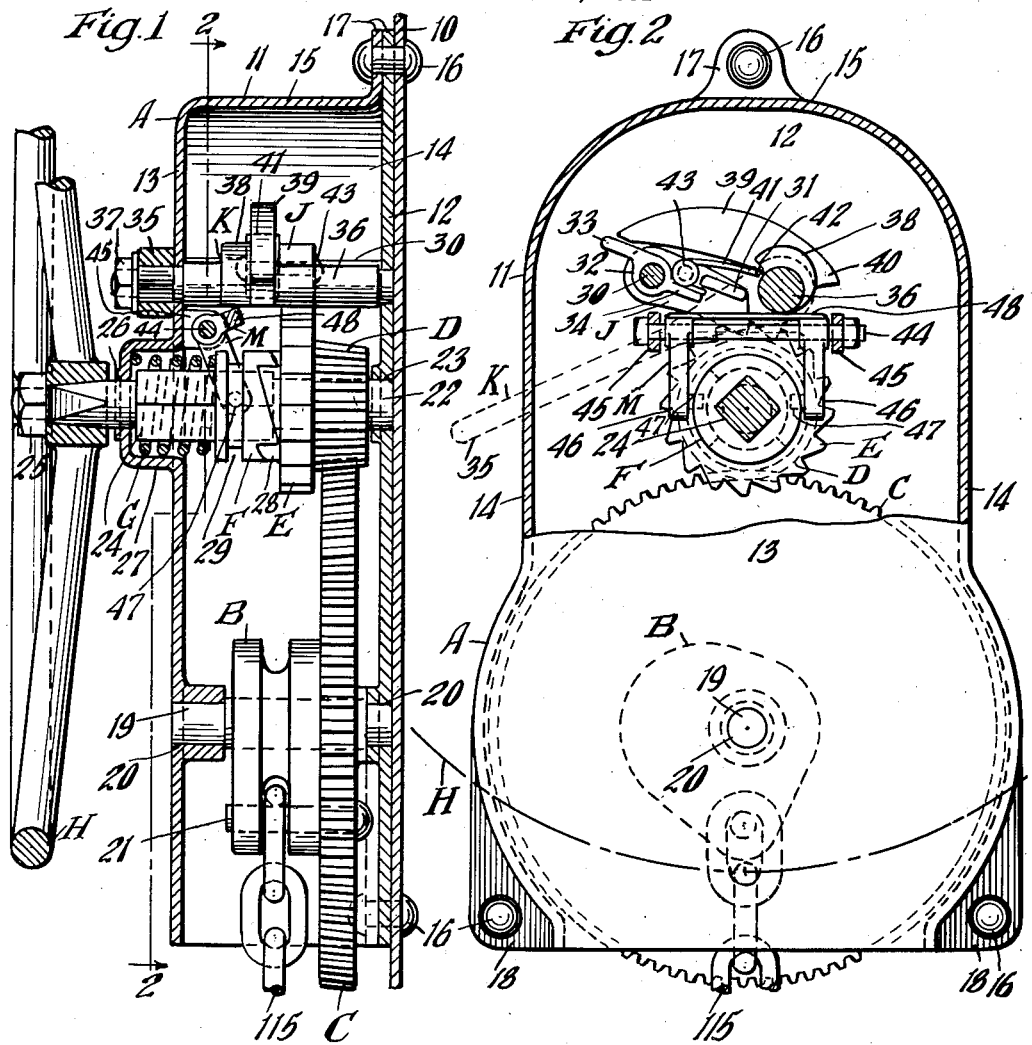
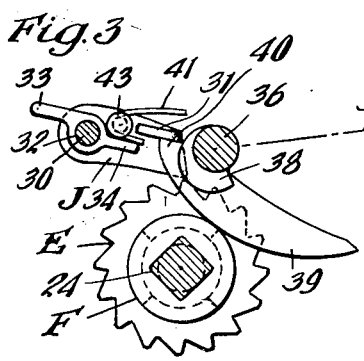
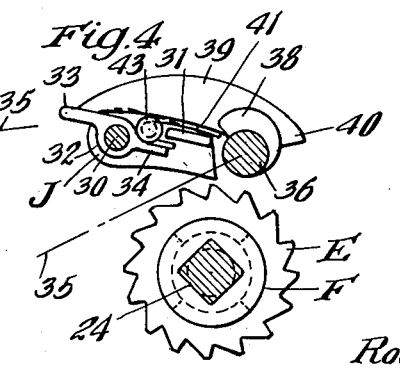
Witness
Wm. Geiger
Inventor
Roland J. Olander
By Henry Fuchs, Atty.

Patented Nov. 27, 1934

1,982,016

UNITED STATES PATENT OFFICE 1,982,016

HAND BRAKE

Roland J. Olander, Chicago, Ill., assignor to W. H. Miner, Inc., Chicago, Ill., a corporation of Delaware Application February 21, 1931, Serial No. 517,506

3 Claims. (Cl. 74—505)

This invention relates to improvements in hand brakes.

One object of the invention is to provide a simple and efficient hand brake mechanism, especially adapted for railway cars, wherein the brake tightening means is actuated by means of a manually operated rotary member connected by releasable clutch mechanism to the tightening means and the tightening means is held against movement in brake releasing direction by a locking dog, and wherein quick release of the brakes is effected by manually controlled means for releasing the locking dog and the clutch mechanism, thereby preventing movement of the rotary operating member during the quick release and protecting the brakeman against injury.

A further object of the invention is to provide in a mechanism of the character specified in the preceding paragraph means whereby the disengagement of the clutch means is effected prior to release of the locking dog, thereby assuring complete disengagement of the clutch means prior to releasing action of the brakes.

Another object of the invention is to provide in a hand brake mechanism including a rotary chain-winding drum, a manually operated rotary member for actuating the drum, releasable clutch means for operatively connecting the actuating member and drum, and a releasable locking dog for holding said drum against rotation in chain unwinding direction; unitary means operative in one direction for releasing the clutch means and dog successively to effect quick release of the brakes, and operative in a reverse direction to effect release of said dog only, thereby permitting operation of the brakes to effect backing up or easing off of the same.

A more specific object of the invention is to provide a power-multiplying hand brake mechanism including a chain-winding drum; power-multiplying gearing for rotating the drum; a rotary hand wheel for operating the brakes; a releasable clutch member for operatively connecting the hand wheel and power-multiplying gearing; a ratchet member and cooperating releasable locking dog for preventing retrograde rotation of the chain-winding drum; a manually actuated lever means swingable in reverse directions for controlling and actuating the clutch means and locking dog, wherein the manually actuated lever means when swung in one direction effects release of the dog only, thus permitting the brakeman to manipulate the hand wheel to back up or ease off the brakes, and when swung in a reverse direction effects operation of the clutch and dog in succession to first release the clutch and then release the dog, thereby permitting free running of the chain-winding drum without imparting any movement to the hand wheel, thus preventing spinning of the latter and protecting the brakeman against injury.

Other objects of the invention will more clearly appear from the description and claims hereinafter following.

In the drawing, forming a part of this specification, Figure 1 is a vertical sectional view through the end wall of a railway car, illustrating my improved hand brake mechanism in vertical section on a plane at right angles to said end wall. Figure 2 is a vertical sectional view of the mechanism shown in Figure 1, corresponding substantially to the line 2—2 of said figure. And Figures 3 and 4 are vertical sectional views corresponding to Figure 2, illustrating a portion of the brake mechanism only and showing particularly the means for controlling and operating the clutch means and locking dog of my improved mechanism, said figures showing the parts in two different positions.

In carrying out my invention, I preferably mount the hand brake mechanism on the vertical end wall of the railway car, said end wall being designated by 10. The operative parts of the mechanism are enclosed within a two-part housing hereinafter more fully described.

The improved hand brake mechanism proper comprises, broadly, a housing A; a chain-winding drum B; a driving gear C; a pinion D meshing with the driving gear; a ratchet E; a sliding clutch F; a clutch spring G; a hand wheel H; a locking dog J; a combined clutch and dog operating means K; and a clutch shipper member M.

The housing A is of two-part construction, and comprises a main body member 11 and a plate-like back wall 12. The body member has a front wall 13 spaced from the plate member 12 and vertical side walls 14—14 merging with a top wall 15, the merging portions of said walls being curved as clearly shown in Figure 2, the general shape of the housing being clearly shown in said figure. The housing is open at the bottom to accommodate the brake chain 115 for movement, the chain being connected to the brake mechanism proper of the car, in a well-known manner. The two sections of the housing may be secured together in any well-known manner and as herein shown are secured together by rivets 16—16 extending through registering ear members 17—17 provided at the top of the main body portion of the housing and the top of the plate 12 and also a pair of flanges 18—18 provided at opposite sides of the bottom portion of the main body of the housing and similar lateral extensions on the back plate 12. As herein shown, the rivets 16—16 also serve to secure the housing to the end wall 10 of the car, said rivets extending through the end wall.

The chain-winding drum B is rotatively supported on a shaft 19 having its front and rear ends journaled in bearing openings 20—20 provided in the front wall 13 and the back plate 12 of the housing, said openings being reinforced by suitable inwardly projecting annular flanges surrounding the same. The chain-winding drum is of the contour illustrated in dotted lines in Figure 2 and has the brake chain 115 connected thereto by a securing pin or locking member 21 extending through the end link of the chain and aligned openings provided in the front and rear portions of the drum, the drum being slotted or cut away between said portions, as clearly shown in Figure 1, to accommodate said end link.

The driving gear C, which is of relatively large diameter, is fixed to the drum B so as to rotate in unison therewith. The gear C may be formed integral with the drum and as shown has an opening therethrough aligned with the pin receiving openings of the drum to accommodate the headed end of the securing pin 21.

The driving pinion D which meshes with the gear C is freely rotatively mounted on a shaft 22 having its inner end journaled in a bearing opening 23 provided in the wall 12 of the housing. The shaft 22 has the inner end portion thereof formed of substantially cylindrically cross section, both the driving pinion D and the ratchet member E being mounted on said section. Outwardly of the cylindrical section, the shaft 22 is formed with a portion of substantially square cross section, said portion being indicated by 24. The outer end of the shaft 22 projects outwardly beyond the front wall 13 of the housing and has the hand wheel H fixed thereto. As shown, the extremity of the shaft 22 is tapered and of substantially square cross section and fits within a similarly formed opening in the hub portion of the hand wheel. The usual securing nut 25 is provided to lock the hand wheel to said shaft. Inwardly of the portion of the shaft on which the hand wheel is secured the same is formed of cylindrical shape and has bearing in an opening 26 in an outwardly projecting hollow boss 27 on the front wall 13 of the housing. The outer end section of the square portion 24 of the shaft is accommodated within the hollow portion of the boss 27, as clearly shown in Figure 1.

The ratchet member E is preferably formed integral with the pinion D and has the hub section 28 on the outer side thereof formed with clutch teeth.

The clutch member F is in the form of a sleeve having clutch teeth at the inner end thereof which cooperate with the clutch teeth of the hub section 28 of the ratchet E. The sliding clutch member has an opening of square cross section which fits the square portion 24 of the shaft 22. The clutch member is held yieldingly engaged with the teeth of the clutch portion 28 of the ratchet member E by means of the clutch spring G which is disposed within the hollow boss 27 and bears at the outer end on the end wall of said boss and at the inner end on the clutch sleeve F. The clutch sleeve is provided with an annular groove 29 with which the shipper member M cooperates.

The driving pinion D is tapered as shown, thereby providing inclined teeth thereon which cooperate with similar inclined teeth on the driving gear C. As will be evident due to the inclined arrangement of the cooperating teeth of the two members of the gearing, the end thrust on the shafts 19 and 22 is equalized.

The locking dog J is pivotally mounted on a transverse rod or shaft 30 disposed above the shaft 22 on which the ratchet member E is mounted. At the outer end the dog is provided with a tooth which is adapted to engage the teeth of the ratchet member E to hold the latter against rotation in chain unwinding direction. Adjacent the tooth the dog J is provided with an outstanding rib 31 for a purpose hereinafter described. At the pivotal portion the dog has a boss 32 formed integral therewith, said boss having an outwardly projecting finger 33 thereon which extends beyond the rear end portion of the dog. At the opposite side of the boss 32 the dog is provided with a second rib member 34 which forms a continuation of the boss and is integral with said dog.

The combined clutch and dog operating means K comprises an operating lever 35 fixed at its end to, or formed integral with, a supporting shaft 36 having its opposite ends rotatively journaled in the front and rear walls of the housing. In the present instance the operating shaft is provided with a portion which projects outwardly of the front wall 13 of the housing to which the operating lever 35 is fixed. As shown, the projecting end portion of the shaft is of square cross section and fits within a square opening provided at the inner end of the lever 35. A securing nut 37 is employed to lock the lever 35 to the shaft 36. The shaft 36 has a cam member 38 formed integral therewith, the cam member forming the actuating means for the clutch shipper member M as hereinafter more fully pointed out. The shaft 36 also has an arm 39 rigid therewith which is adapted to engage the finger 33 of the dog J to depress said finger and trip the dog to disengage the tooth thereof from the ratchet member E when the lever 35 is depressed. The arm 39 has a projecting lip 40 at the opposite end thereof which cooperates with the rib 31 of the dog as hereinafter pointed out. The dog J is yieldingly held engaged with the teeth of the ratchet member E by means of a spring 41 which has one arm thereof bearing on the rib 34 of the dog and the other arm bearing on the underside 42 of the arm 39, the intermediate portion of the spring being looped about a pin 43 fixed to the main body portion of the dog above the rib 34.

The clutch shipper means M is mounted on a bolt 44 having its opposite ends supported in inwardly projecting lugs 45—45 on the front wall of the housing. The shipper member has a pair of depending fingers which form a fork member 46 embracing the clutch sleeve F. On the inner sides the fingers forming the fork are provided with trunnion members 47—47 which engage within the groove 29 of the clutch sleeve. The shipper member M has a laterally extending rigid flange portion 48 at the top thereof which cooperates with the cam 38. As will be evident when the cam 38 is rotated so as to bring the enlarged portion thereof into engagement with the flange 48 of the shipper member, the latter will be oscillated so as to shift the clutch sleeve F to the left, as viewed in Figure 1, and disengage the same from the teeth of the cooperating clutch member of the ratchet E.

In assembling my improved hand brake mechanism, the shaft 19 with the chain-winding drum and driving gear C mounted thereon, the shaft 22 with the pinion D, the ratchet member E, the clutch member F, and the spring G mounted thereon, the shipper member M, and the shaft 36 of the combined clutch and dog operating means K are first mounted in the housing section 11 and the back wall of the plate is then applied and secured in position. The hand wheel is then attached to the outer end of the shaft 22 and the actuating lever 35 secured to the outer end of the shaft 36.

The operation of my improved hand brake mechanism is as follows: To tighten the chain the brakeman rotates the hand wheel in a clockwise direction, as viewed in Figure 2, thereby rotating the shaft 22 and the pinion D. As will be understood, the clutch member F is at this time held yieldingly engaged with the clutch teeth of the ratchet member by means of the spring G, thereby operatively connecting the shaft 22 to the ratchet member and the pinion D. The pinion D which meshes with the gear C effects rotation of the chain-winding drum B in a direction to wind the chain 115 thereon and tighten the brakes. During the tightening operation, the locking dog J which yieldingly engages the ratchet E prevents rotation of the chain-winding drum in unwinding direction by preventing rotation of the intermeshing gears. To effect quick release of the brakes the operating lever 35 is pulled upwardly, as viewed in Figure 2, thereby rotating the shaft 36 and bringing the high portion of the cam 38 into engagement with the clutch shipper member M, thus shifting the clutch to the left, as viewed in Figure 1, and entirely disengaging the same from the cooperating clutch member of the ratchet E. At the same time the lip 40 will be advanced in unison with the cam 38 and finally engages the rib 31 of the dog J, thereby lifting the same out of engagement with the ratchet teeth of the member E, as clearly shown in Figure 3. This disengagement of the dog takes place subsequent to the release of the clutch member F. When the dog has been completely released, as described, the chain-winding drum is free to rotate to permit unwinding of the chain and complete release of the brakes. As will be obvious during the rotation of the drum in chain-unwinding direction the gear C and the pinion D together with the ratchet E will also be rotated. However, rotation of the hand wheel and the shaft 22 to which the same is secured is entirely prevented during this operation because the clutch has been completely disengaged from the ratchet member prior to release of the locking dog. In order to again bring the parts to operative position the lever 35 is dropped to the dotted line position shown in Figure 2, whereupon the cam will be moved out of engagement with the clutch shipper means M and the lip 40 disengaged from the dog. This permits the spring G to return the clutch sleeve F to engaging position and also permits the spring of the locking dog to depress the latter and reengage the tooth thereof with the teeth of the ratchet member E.

When it is desired to ease off or back up the brakes, the lever 35 is depressed or swung downwardly from the position shown in Figure 2, thereby engaging the arm 39 with the finger 33 of the dog J, lifting the tooth of the dog out of engagement with the ratchet member E, as shown in Figure 4. The brakeman may then manipulate the hand wheel H in a well-known manner to secure the desired action of the brake mechanism.

From the preceding description taken in connection with the drawing, it will be evident that I have provided a simple and efficient hand brake mechanism of the power-multiplying type, wherein quick release of the brakes is obtained without imparting any movement to the hand wheel, thereby eliminating all danger of spinning of the latter, and protecting the brakeman against injury. Further, my improved mechanism provides unitary controlling means by which the hand wheel is disengaged from the winding mechanism, and at the same time release of the locking dog is effected subsequent to the release of the connection between the hand wheel and the winding element, thereby ensuring complete disconnection of the hand wheel before the winding element is permitted to rotate in unwinding direction. It is further pointed out that by my improved mechanism unitary means operated by a single lever mechanism is provided for either effecting quick release of the brakes without rotation of the hand wheel or adjusting the parts so that the hand wheel may be manipulated to back up or ease off the brakes.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain-winding element; of rotary means for actuating said chain-winding element; releasable clutch means operatively connecting said rotary means and element; releasable locking means for preventing rotation of said element in unwinding direction; a cam member adapted to actuate said clutch means; a lever movable in one direction for actuating said cam; a finger movable in unison with said cam for tripping said locking means subsequent to release of the clutch means; and a second trip finger movable in unison with said lever and cam means operative when the lever is swung in a reverse direction for tripping the locking means only.

2. In a power-multiplying hand brake mechanism, the combination with a rotary chain-winding drum; of a gear fixed to said drum; a pinion meshing with said gear; a rachet fixed to said pinion; a spring-pressed pivoted locking dog preventing rotation of said ratchet in chain-unwinding direction; an operating hand wheel; a releasable spring-pressed sliding clutch operatively connecting the hand wheel and pinion; a clutch shifting member; an oscillating lever; cam means fixed to said lever for actuating the shifting means to release the clutch when said lever is swung in one direction; a pair of trip fingers fixed to said lever, said fingers respectively engaging and tripping the dog to release the same, one of said fingers tripping said dog when the lever is swung in a direction to release said clutch and the other finger tripping the dog when the lever is swung in the reverse direction.

3. In a hand brake mechanism, the combination with a rotary chain-winding element; of rotary means for actuating said chain-winding element; releasable clutch means operatively connecting said rotary means and element; releasable locking means for preventing rotation of said element in unwinding direction; and manually operated lever means operatively connected to both said releasable clutch means and said releasable locking means for controlling the same, said lever being movable in one direction for releasing said locking means, and movable in a reverse direction for releasing said clutch means and locking means in succession.

ROLAND J. OLANDER.